May 5, 1959 H. W. ROCKWELL 2,885,022
STEERING MECHANISM
Filed Dec. 17, 1956 3 Sheets-Sheet 1
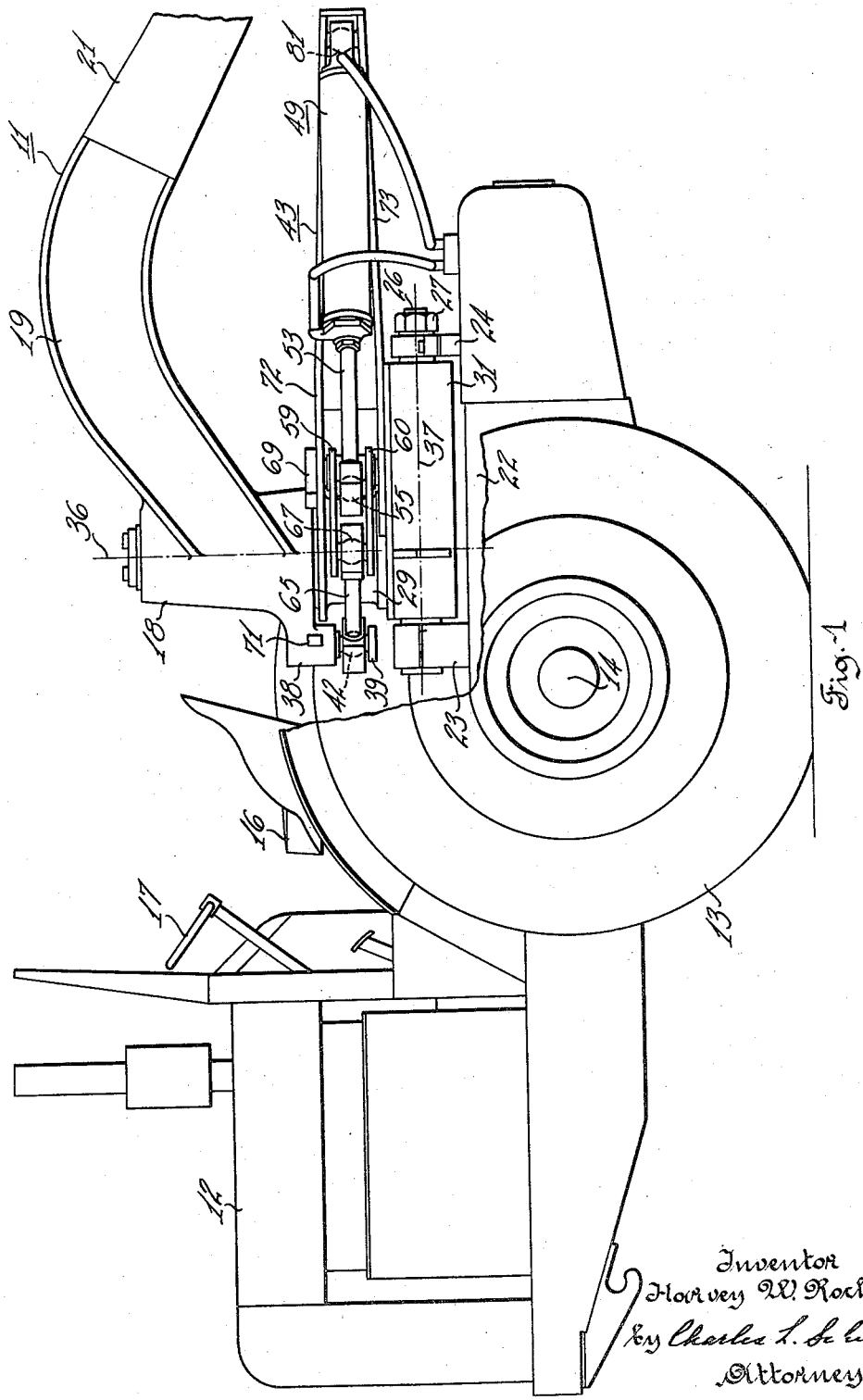
Inventor
Harvey W. Rockwell
by Charles L. Schwab
Attorney

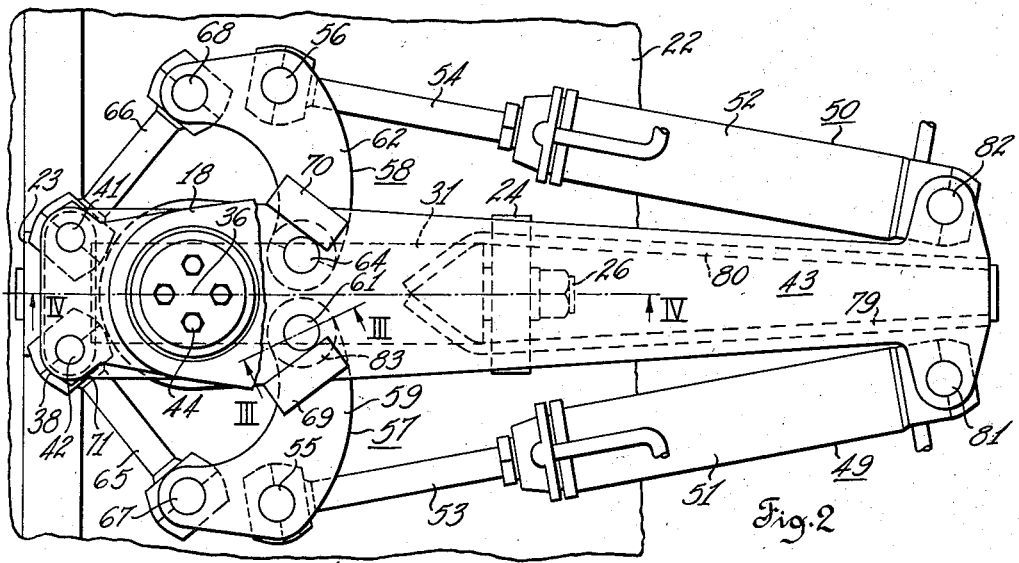
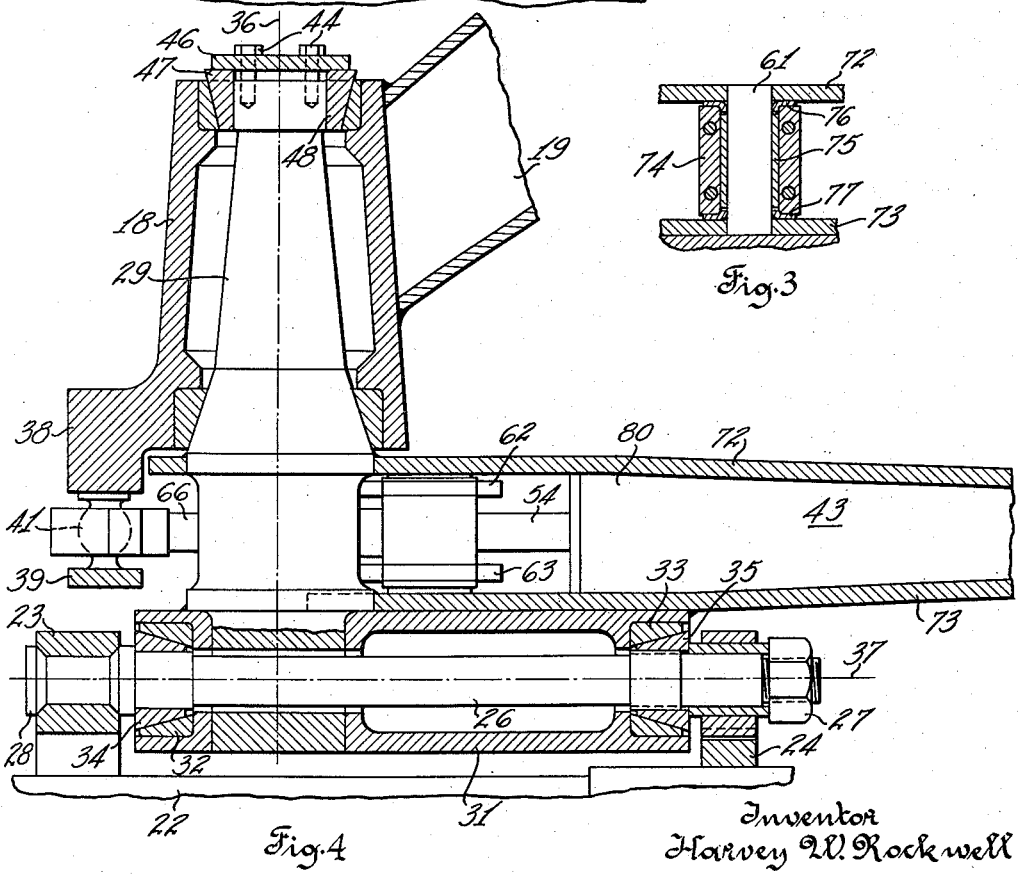

United States Patent Office 2,885,022
Patented May 5, 1959

2,885,022

STEERING MECHANISM

Harvey W. Rockwell, Cedar Rapids, Iowa, assignor to Allis-Chalmers Manufacturing Company, Milwaukee, Wis.

Application December 17, 1956, Serial No. 628,593

2 Claims. (Cl. 180—79.2)

This invention relates to an improvement in a steering mechanism and is especially concerned with the steering mechanism for articulated vehicles of the type in which a wheel supported draft unit and a wheel supported trailer unit are pivotally connected with each other for relative angular movement with respect to each other about a common vertical axis. Steering in such vehicles is generally accomplished by angling these units about the common vertical axis or "fifth wheel" axis.

A common example of such an articulated vehicle is a rubber tired, two wheel tractor and scraper. Because such a vehicle is usually of heavy construction, a power actuated mechanism is necessary to vary and hold the relative angular rotation of the front and rear units. Hydraulic rams have been used as a suitable power means to supply the substantial amount of torque required to effect this relative angular rotation between the two units.

Earth moving vehicles such as a scraper are generally operated off the highway and may be subjected to extreme conditions of operation such as when the vehicle is hauling earth over rough terrain. For this reason it is required that some means be provided for transverse oscillation of the draft unit with respect to the trailing unit.

A steering mechanism representative of those used on articulated vehicles is disclosed in my Patent 2,638,998, issued May 19, 1953. It contains a system of linkages generally similar in appearance to the one disclosed in this application but differing in certain significant structural features. In the earlier steering mechanism the multiplying levers are pivoted to a common upstanding fulcrum pin against which the combined thrust forces of the hydraulic ram are exerted. To resist these forces and to provide sufficient bearing surface, such a common fulcrum pin must be of rugged and durable construction.

In the former design a hitch structure subframe is curved upwardly to position the rams and to resist the thrust forces exerted by the rams. Such a design results in a large and heavy elongated subframe which must resist any bending movement imposed upon it by the hydraulic rams and also support the hitch load. It also results in a higher overall vertical height for the hitch and steering mechanism assembly.

Such a structural arrangement also necessitated that the steering mechanism linkage jackknife around a kingpin housing. The farther the linkage system functions from the vertical pivot axis, the greater is the lateral displacement of its moving elements and a greater lateral displacement results in an increased space consumption by the steering mechanism and presents problems of interference during steering.

It is desirable, therefore, in a steering mechanism of this type that there be a minimum lateral displacement of moving parts from the vertical pivot axis. It is also desirable that the linkage system have its own frame structure so that the thrust and torque exerting elements are coplanar with this frame structure.

It is, therefore, a general object of the invention to provide an improved linkage system in a power operated steering mechanism.

A further object of the invention is to provide an improved structural arrangement for a steering mechanism by providing a separate force resisting frame that is effectively coplanar with the thrust and torque exerting elements.

Another object of this invention is to reduce the space requirements for a steering mechanism in an articulated vehicle by providing for minimum lateral displacement of its moving parts and by decreasing the overall vertical height of the steering mechanism and hitch assembly.

Another object of this invention is to provide an improved hydraulically operated steering mechanism for articulated vehicles which will incorporate the heretofore outlined requirements in a practical and fully satisfactory manner.

The foregoing and other objects and advantages are attained by the present invention, various novel features of which will become apparent as the following specification is read in conjunction with the accompanying drawings wherein:

Fig. 1 is a side elevation showing the gooseneck portion of a trailer and a tractor with a portion of the tire cut away to illustrate the steering mechanism of this invention;

Fig. 2 is a top view of the rear part of the two wheel tractor and associated steering mechanism with the draft yoke cut away as indicated by the broken line;

Fig. 3 is a sectional view along line III—III of Fig. 2;

Fig. 4 is a sectional view along line IV—IV of Fig. 2; and

Figure 5:
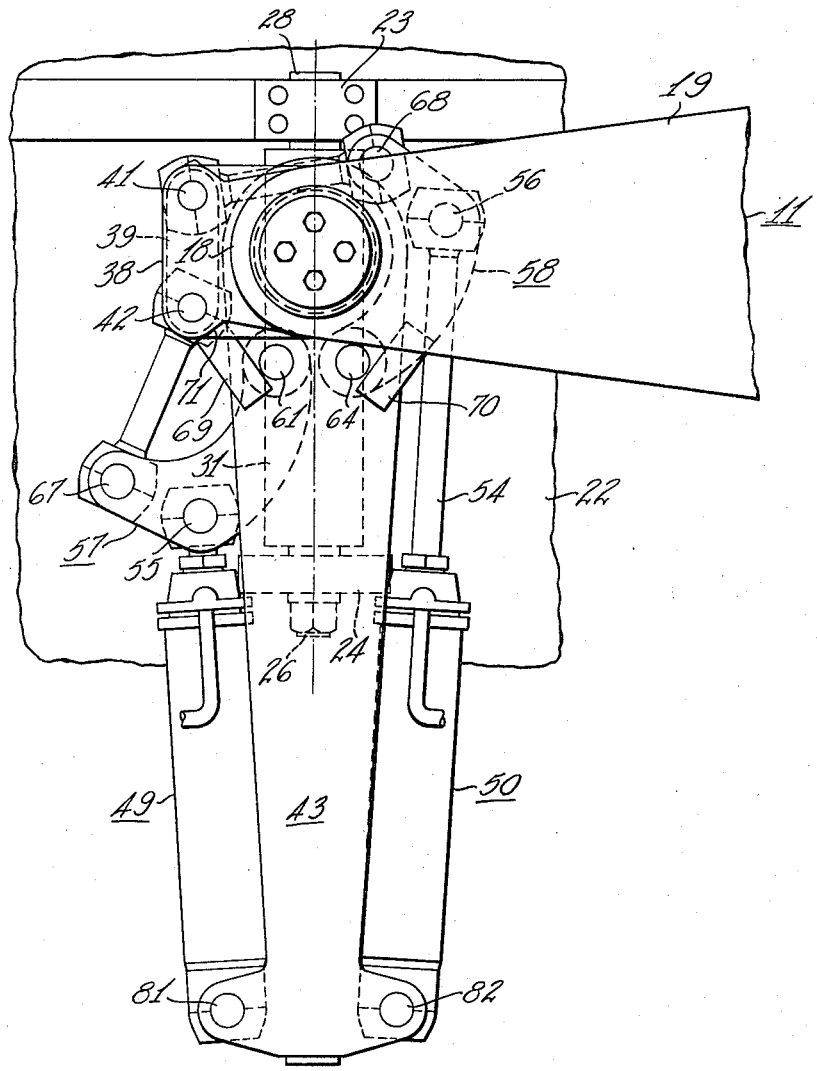
Fig. 5 is a view similar to Fig. 2, but illustrtating a steering condition in which the tractor is turned 90° to the right from the straight course driving position in which it is shown in Fig. 2.

Referring to Fig. 1, the two wheel tractor unit is pivotally connected to a trailer unit by means of a draft member 11. The tractor unit includes a source of power located under the hood 12 and a pair of oppositely disposed traction wheels 13 which are mounted on a rigid frame structure for rotation about a transverse axis 14. A suitable operator's 16 is provided behind the steering wheel 17 so that the operator can control the steering mechanism from this station. Such a steering wheel 17 is customarily connected to a hydraulic control valve installed in a conventional hydraulic system, not shown.

The draft member 11 includes kingpin housing 18, a gooseneck 19, and a transverse frame bar 21, which are rigidly connected together and are a part of a conventional trailer unit having a pair of rear ground engaging wheels, not shown, which are mounted for rotation about an axis parallel to the tractor wheel axis 14 so that when the articulated vehicle is in a straight course driving position, this axis of rotation will be parallel to the tractor wheel axis. The gooseneck 19 is so arched that the steering mechanism and rear portion of the tractor can swing underneath during the rotation of the tractor unit from a 90° position to the right to a 90° position to the left of the longitudinal axis of the vehicle.

Referring to Figs. 1 and 4, two upstanding brackets 23, 24 are attached to a central portion of the tractor frame structure 22 and project upwardly therefrom to support a horizontal pivot pin 26. A nut 27 and a flange 28 hold the horizontal pivot pin 26 against longitudinal displacement within the upstanding brackets, 23 and 24.

The draft member 11 rotatably engages a kingpin 29 which is rigidly connected to a sleeve 31 and is restrained against longitudinal motion relative to the tractor unit by the two upstanding brackets 23 and 24. The horizontal sleeve 31 has suitable bearings, 32 and 33, engaging corresponding bearings, 34 and 35, mounted on the horizontal pivot pin 26. As shown in Fig. 4 the vertical axis 36 of the kingpin 29 intersects the axis 37 of the horizontal pivot pin 26 at right angles. This type of articulation permits the tractor unit and the trailer unit to rotate about a vertical axis for steering and permits the draft member and the trailer unit to tilt about the longitudinal axis 37.

Referring again to Fig. 1, a torque arm 38 is integrally formed with the forward portion of the kingpin housing and projects outwardly and downwardly to support two depending vertical ball pivot pins, 41 and 42, rigidly interconnected by a connecting plate 39. In my former practice the lower ends of the pivot pins 41 and 42 were attached to a bracket extending from a kingpin housing 18. This necessitated connecting the steering mechanism at a higher vertical point to prevent interference with a hitch subframe structure. Also, in my former practice it was necessary to have an upswept rear portion of the subframe in order to avoid interference with a subframe structure as the tractor unit was angled relative to the trailer unit. Because of the substantial thrust forces involved the upswept portion of the subframe had to be of heavy and durable construction to prevent undue stressing of the support brackets. These structural features were obviated by the provision of a separate steering mechanism frame 43.

Referring to Fig. 4, the kingpin housing 18 is secured against axial separation from the kingpin 29 by a plurality of studs 44, and a securing plate 46 which secures a bearing 47 in a rotatable relationship with a kingpin housing bearing 48.

Referring to Figs. 2 and 5, the hydraulic rams 49 and 50 are pivotally mounted at the rear portion of the frame. The rams 49, 50 include cylinders 51, 52 and piston connecting rods 53, 54. The piston rods 53 and 54 are connected by ball pivot pins 55 and 56 to an intermediate portion of a pair of multiplying levers 57 and 58. The levers 57 and 58 are constructed for symmetry in inverted positions. Lever 57 includes an upper lever plate 59 and a lower lever plate 60 between which a fulcrum pin 61 is mounted. The lever 58 incudes an upper lever plate 62 and a lower lever plate 63 between which fulcrum pin 64 is mounted. The fulcrum pivot pins 61 and 64 are spaced at laterally opposite sides of the longitudinal axis 37.

The swingable ends of the multiplying levers 57 and 58 straddle the swingable end of connecting links 65 and 66. The other ends of the links 57 and 58 are connected to torque arm pivot pins 67 and 68. To limit the extremes of steering movement a pair of suitable stops 69 and 70 are placed in predetermined positions on the steering mechanism frame to engage matching surfaces 71, only one of which is shown, on the kingpin torque arm 38.

As distinguished from my former practice, two fulcrum pins 61 and 64 are provided on a steering mechanism frame. In my former practice a single upstanding fulcrum was mounted on the top of the hitch subframe and had an unsupported free end. To provide the required bearing surface the fulcrum pin had to be of large construction. Due to the fact that the pin was secured at one end and due to the heavy loads imposed upon the pin during each steering operation, the welds securing the pin to the frame were severely stressed. In my present improvement a pair of fulcrum pins 61 and 64 are now supported at each end as shown in Fig. 3.

Referring to Fig. 3, fulcrum pin 61 is secured as by welding to upper and lower plates 72, 73 of the steering mechanism frame 43. A bushing cap 74 and the bushing block 83 house the bushings 75 and upper and lower flanges 76, 77. The bushing block 83 is integrally formed with the inner end of the multiplying lever 57. The bushing cap 74 is joined to the bushing block 83 by a plurality of studs.

Referring to Figs. 2 and 4, the steering mechanism frame 43 is constructed of upper and lower horizontal plates 72 and 73 joined by two vertical stiffening plates 79 and 80. At the rearward end of plates 72 and 73 a pair of arms extend laterally outward to support ball pivot pins 81 and 82 about which the cylinder ends of the hydraulic rams 49 and 50 are rotatably engaged. At its forward end the upper plate 72 completely encircles the kingpin 29. The lower plate 73 at its forward end has a shortened arcuate portion engaging the rear section of the kingpin 29 to provide sufficient clearance for the connecting plate 39 as the tractor unit is angled during steering of the vehicle.

Steering of the vehicle is accomplished by adjusting the relative angular position of the tractor and trailer units about the common pivot axis 36. The angular variation is brought about by the thrust forces exerted against the kingpin housing torque arm 38 and the steering mechanism frame 43. These thrust forces are brought about by an extension or contraction of the hydraulic rams 49 and 50. Suitable pressure fluid connections, not shown, are made between the hydraulic rams 49 and 50 and a conventional control valve, not shown, operatively connected to the steering wheel 17. The operator may rotate the wheel 17 to extend or contract the hydraulic rams 49 and 50 to effect steering of the vehicle.

Steering motion in one direction is effectuated by a compressive stress in the connecting link 66. Extension of the hydraulic ram 50 from the position shown in Fig. 2 moves the piston rod 54 in a forward direction, thereby causing a compressive force to be exerted on the outer portion of the multiplying lever 58. This produces a reaction on the torque arm 38 and pivot pin 82 which cause the tractor unit to swing to the right until it eventually reaches the position shown in Fig. 5. The hydraulic circuit is so arranged that when ram 50 is expanded the ram 49 will be contracted. It should be noted that, as distinguished from my former practice, the link 66 and the multiplying lever 58 jackknife around the recessed portion of the kingpin 29 free of any interference because the lower plate 73 of the steering mechanism frame 43 does not completely encircle the kingpin and the torque arm pivot pins 67 and 68 are not attached at their lower ends to the kingpin housing 18. In my former practice a multiplying lever and a link jackknife about a kingpin housing with the result that these parts have to be proportionally larger and define a wider path of travel as the vehicle is being angled in one direction or the other. The multiplying levers 57 and 58 in my present improvement are more sharply arched so that it can follow around the kingpin with a minimum amount of lateral displacement. In my former practice the outer portion of the multiplying lever had to extend outwardly in a straight direction to avoid the interference presented by the increased diameter of the kingpin housing.

Steering motion in the opposite direction is effectuated by a tensile stress in the piston rod 54 and in the link 66. This results when hydraulic pressure is admitted to the forward end of the cylinder to exert its force on the forward end of the piston, the piston rod 54 thereby being placed in tension and withdrawing into the cylinder 52. The rearward movement of the multiplying lever 58 causes the link 66 to exert a tensile force on the torque arm 38 causing a reversal of steering rotation between the tractor and the trailer. Thus, it is possible to accomplish steering in either direction by reversing the motion of the piston rod 54.

In this embodiment the stop blocks 69 and 70 are in a predetermined location on the top plate 72 of the steering mechanism frame 43 to limit the steering of the vehicle from a straight ahead position to 90° to either side. It should be noted that steering can be accomplished by the use of single hydraulic mechanism and its associated multiplying lever and link or by a plurality of hydraulic rams and the associated linkages disposed about vertical axis 36.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A steering mechanism for an articulated vehicle having first and second units pivotally interconnected by a draft member for relative angular rotation of said units about a common vertical axis, said mechanism comprising: a cooperating pivot member disposed on said vertical axis and mounted on said first unit, a horizontally extending frame having vertically spaced upper and lower plates, said plates having their forward portions secured to the said cooperating pivot member, a fulcrum pin having its opposite ends secured to said plates in horizontally spaced relation to said vertical axis, a multiplying lever pivotally connected at one of its ends to said fulcrum pin, a hydraulic jack having a pair of relatively expansible and contractible elements, means pivotally connecting one of said elements to the rearward portion of said frame, means pivotally connecting the other of said elements to an intermediate portion of said multiplying lever, a torque arm projecting from the forward end of said draft member and presenting a depending pivot pin, a link pivotally connected at one end to said pivot pin and at its other end to the other end of said lever, said lever and link jackknifing around the portion of said cooperating pivot member between said plates upon actuation of said jack.

2. A steering mechanism for an articulated vehicle having front and rear units interconnected for relative horizontal angling, said mechanism comprising: a kingpin secured to said front unit having a journal portion at its upper end and an arcuate recessed portion at its lower end, a horizontally extending frame having vertically spaced upper and lower plates, said plates having their forward portions secured to said kingpin, a fulcrum pin having its opposite ends secured, respectively, to said plates, a horizontally disposed multiplying lever having one side curved in complementary relationship to said lower portion of said kingpin, means pivotally connecting said lever at one of its ends to said fulcrum pin, a link pivotally connected at one of its ends to the other end of said lever, a depending torque arm rigidly associated with said rear unit in a radially spaced relation to said lower portion of said kingpin, means pivotally connecting the other end of said link to said torque arm, a hydraulic jack having a pair of relatively expansible and contractible thrust transmitting elements, means pivotally connecting one of said elements to said frame, and means pivotally connecting the other of said elements to an intermediate portion of said multiplying lever, said lever and link jackknifing around said arcuate recessed portion of said kingpin between said plates when said jack is extended.

References Cited in the file of this patent
UNITED STATES PATENTS

| | | |
|---|---|---|
| 2,362,262 | French | Nov. 7, 1944 |
| 2,638,998 | Rockwell | May 19, 1953 |
| 2,781,860 | Herr et al. | Feb. 19, 1957 |